United States Patent [19]
Tveter

[11] 3,800,591
[45] Apr. 2, 1974

[54] HOLLOW REACTION TORQUEMETER

[75] Inventor: Richard S. Tveter, Barrington, Ill.

[73] Assignee: S. Himmelstein and Company, Elk Grove Village, Ill.

[22] Filed: Mar. 27, 1972

[21] Appl. No.: 238,239

[52] U.S. Cl. .............................................. 73/136 A
[51] Int. Cl. .............................................. G01l 5/10
[58] Field of Search ..................... 73/136 A, 133 R

[56] References Cited
UNITED STATES PATENTS

| | | | |
|---|---|---|---|
| 2,260,036 | 10/1941 | Kuehni | 73/136 A |
| 3,672,213 | 6/1972 | Watson | 73/136 A |
| 2,737,049 | 3/1956 | Waugh | 73/136 A |
| 2,392,293 | 1/1946 | Ruge | 73/136 A |
| 2,431,260 | 11/1947 | Langer | 73/136 A |

*Primary Examiner*—Charles A. Ruehl
*Attorney, Agent, or Firm*—Hofgren, Wegner, Allen, Stellman & McCord

[57] ABSTRACT

A hollow reaction torquemeter for use in measuring or gauging a torque. The torquemeter includes a strain gauge carried on a torque measuring tube coaxially disposed within a tubular torque transmitting member with the torque portion transmitted through the torque measuring tube being less than the torque transmitted through the torque transmitting member. The torque transmitting member effectively comprises a sheath surrounding the torque measuring tube and provides a high polar moment of inertia for desired control of the torque transmitting characteristics while yet permitting the torque transmitting member to comprise a thin walled, relatively low cost tube.

8 Claims, 5 Drawing Figures

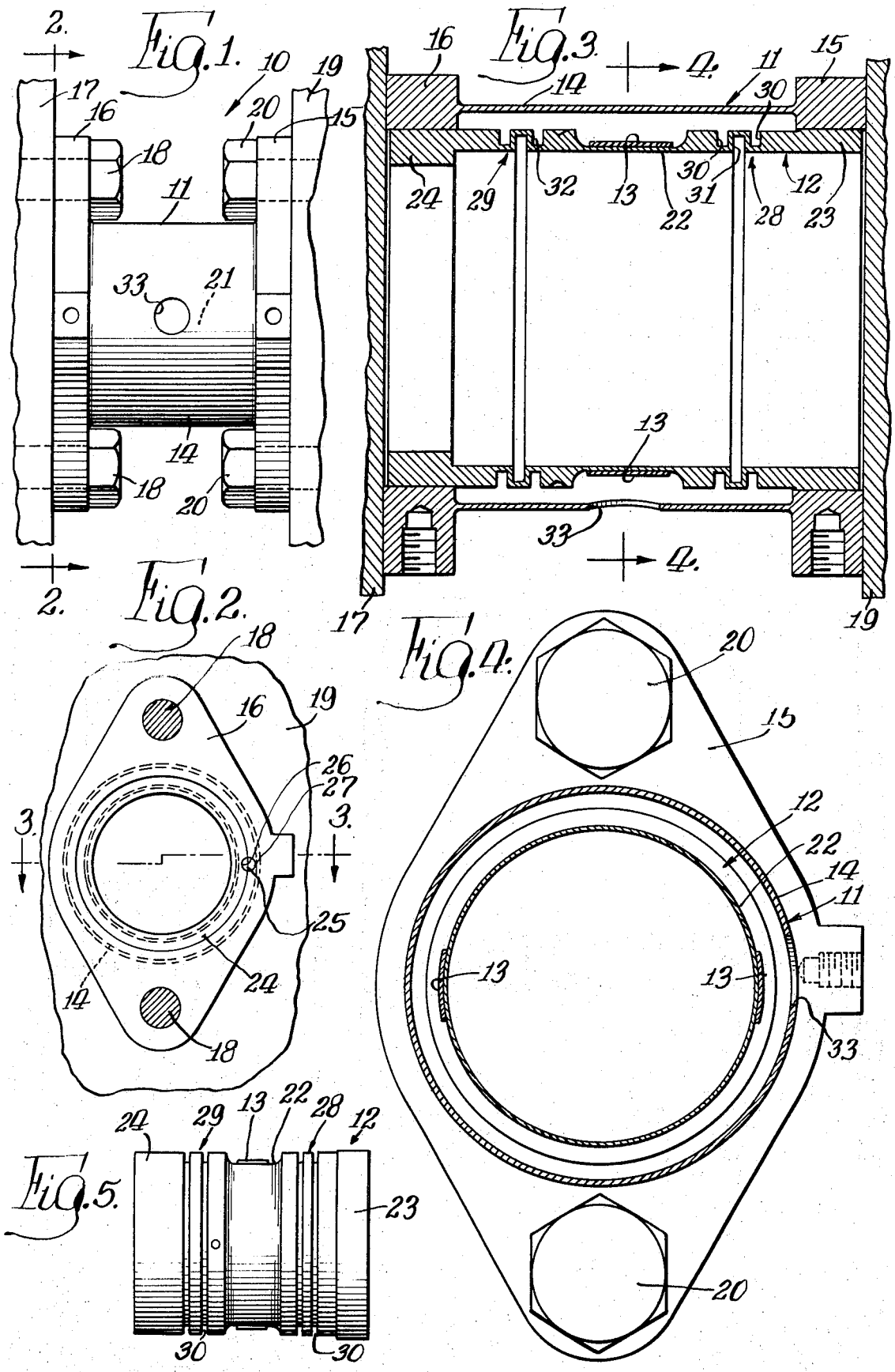

HOLLOW REACTION TORQUEMETER

BACKGROUND OF THE INVENTION

1. Field of the Invention

This invention relates to torquemeters and in particular to torquemeters utilizing strain gauges for gauging a transmitted torque.

2. Description of the Prior Art

One form of conventional torquemeter comprises a torque transmitting member on which is mounted a strain gauge. As torque is transmitted through the member, a twist in the member produced by the transmitted torque is sensed by the strain gauge which acts as a transducer to provide a suitable electrical signal for indicating or controlling the torque as desired. An excellent example of such a torquemeter is shown in U.S. Letters Pat. No. to Richard S. Tveter 3,531,748 owned by the assignee hereof.

An earlier form of strain sensing device is shown in the U.S. Letters Pat. No. issued to C.J. Buzzetti et al. 2,722,587, wherein strain gauges are mounted on a beam secured to a load carrying member 16. In the Buzzetti el al sensing device, the strain gauges are carried on a portion of the beam intermediate a pair of thin flexural portions. The portion of the beam on which the strain gauges are mounted is at least several times thicker than the thin flexural portions which, in turn, are substantially thinner than the main section of the beam. The strain gauges are exposed outwardly of the force transmitting member.

In the C.C. Waugh U.S. Letters Pat. No. 2,737,049, a torquemeter is disclosed wherein a bellows-type flexible joint structure is provided in the sleeve which carries an armature which cooperates with a pair of pole pieces to provide a measure of torque.

SUMMARY OF THE INVENTION

The present invention comprehends an improve torquemeter utilizing a thin-walled sheath member for carrying a major portion of the torque being transmitted through the device, and a torque measuring tube coaxially within the torque transmitting member carrying suitable strain sensing devices for gauging the transmitted torque.

More specifically, the invention comprehends an improved hollow reaction troquemeter including a tubular torque transmitting member having a radial thin wall mid-portion, one end adapted to receive a torque and an opposite end adapted to deliver a torque transmitted from one end through the mid-portion to the opposite end, a tubular torque measuring tube coaxially within the torque transmitting member having axially spaced portions and a radially thin portion intermediate the spaced portions and having a length a minor portion of the length of the torque measuring tube, means fixedly securing the spaced portions to the torque transmitting member, the torque transmitting member and torque measuring tube being constructed so that a first, major portion of a torque being transmitted between the torque transmitting member ends is transmitted through the torque transmitting member and a second, minor portion of the torque is transmitted through the torque measuring tube, and means for gauging a twist strain in the torque measuring tube thin portion for determining the amount of torque being transmitted concurrently through the torque transmitting member and torque measuring tube of the torquemeter.

The torquemeter may be constructed so that the torque transmitted through the torque transmitting member is over twice that transmitted through the torque measuring tube. The strain gauges of the present torquemeter are mounted on the thinnest portion of the torque measuring tube. The thin portion of the torque measuring tube may have a length approximately one-third that of the torque transmitting member.

The torque measuring tube may include a grooved portion intermediate the thin portion and one of the spaced portions, the grooved portion being defined by a first, radially inwardly opening groove and a second, radially outwardly opening groove axially spaced adjacent the first groove, the wall thickness of the torque measuring tube radially of the grooves being approximately one-twentieth the wall thickness of the torque measuring tube axially adjacent the grooves. The thin portion of the torque measuring tube may have a wall thickness approximately one-half that of the torque measuring tube adjacent said grooves.

The torque transmitting member mid-portion may have a wall thickness approximately one-one hundredth the inner diameter thereof and at least approximately twice the thickness of the torque measuring tube thin portion.

The hollow reaction torquemeter of the present invention is extremely simple and economical of construction while yet providing an improved high accuracy function in a novel and simple manner.

BRIEF DESCRIPTION OF THE DRAWING

Other features and advantages of the invention will be apparent from the following description taken in connection with the accompanying drawing wherein:

FIG. 1 is a side elevation of a hollow reaction torquemeter embodying the invention connected between a pair of load members;

FIG. 2 is a vertical section taken substantially along the line 2—2 of FIG. 1;

FIG. 3 is a horizontal section taken substantially along the line 3—3 of FIG. 2;

FIG. 4 is a vertical section taken substantially along the line 4—4 of FIG. 3; and FIG. 5 is a side elevation of the torque measuring tube of the torquemeter.

DESCRIPTION OF THE PREFERRED EMBODIMENT

In the exemplary embodiment of the invention as disclosed in the drawing, a hollow reaction torquemeter generally designated 10 is shown to comprise a tubular torque transmitting member generally designated 11, a torque measuring tube generally designated 12, and strain gauges 13 carried on the torque measuring tube defining a transducer for providing an electrical signal corresponding to torque being transmitted through the torquemeter.

The torque transmitting member 11 includes a radially thin wall mid-portion 14 and flanged ends 15 and 16. As shown in FIG. 1, flanged end 16 may be secured to a load member 17 as by suitable bolts 18 and flanged end 15 may be secured to a load member 19 by suitable bolts 20. Rotation of one load member 17 or 19 about the common axis 21 relative to the other load member produces a torque which is transmitted through the hollow reaction torquemeter 10 to the other load member. A portion of this transmitted torque is sensed by the strain gauges 13 to provide the desired output electrical signal.

A major portion of the transmitted torque is transmitted through the torque transmitting member. A minor portion of the transmitted torque is transmitted through the torque measuring tube. The ratio of these two transmitted torques is fixed and preselected by the construction of the torque transmitting member and torque measuring tube, and in the present embodiment, the ratio is at least approximately two to one. However, torque measuring tube 12 defines a radially thin midportion 22 on which the strain gauges 13 are carried and which portion of the torquemeter effectively defines the portion exhibiting maximum strain or deflection in the transmission of the torque through the torquemeter. The torque transmitting member thin portion 14 has a wall thickness preferably at least approximately twice that of the thin portion 22 of the torque measuring tube and in the illustrated embodiment, has a thickness approximately three times that of the torquemeter tube portion 22. Resultingly, while a major portion of the torque is transmitted through member 11, a mechanical amplification of the lesser torque transmitted through tube 12 provides a positive signal in strain guages 13. In the illustrated embodiment, mid-portion 22 may have an axial length approximately one-third that of the axial length of the torque transmitting member portion 14. Illustratively, in a torquemeter of the disclosed type adapted for transmitting up to 1,200 pound inches of torque, the wall 14 had a thickness of 0.03 inch and the wall portion 22 had a thickness of 0.01 inch to provide a torque transmitting ratio of approximately 2.06 to 1. In a smaller version adapted to transmit up to 600 pound inches of torque, wall 14 had a thickness of 0.015 inch and wall portion 22 had a thickness of 0.05 inch to provide a torque ratio of 2.42 to 1. In this smaller version, the inner diameter of the wall portion 22 was approximately 1.375 inches and the inner diameter of the wall 14 was approximately 1.710 inches. The length of wall port on 14 was approximately 1.5 inches and the length of wall portion 22 was approximately 0.5 inch. The overall length of the torque transmitting member was approximately 2.125 inches.

The torque measuring tube includes relatively thick end portions 23 and 24 which may be press-fitted into the flanged ends 15 and 16 of the torque transmitting member. Further, to lock the torque measuring tube against rotation relative to the torque transmitting member, a dowel 25 may be inserted into suitable semi-cylindrical recesses 26 and 27 in the torque measuring tube and torque transmitting member, respectively, as shown in FIG. 2. Thus, a torque applied to between the opposite ends of the torque transmitting member is transmitted not only through the wall portion 14 thereof, but also through the torque measuring tube so as to produce a signal in the strain gauges 13.

To eliminate a bending moment effect in the torque measuring tube and thereby increase the accuracy of the torque-meter, a pair of grooved portions generally designated 28 and 29 are provided in the torque measuring tube at opposite sides of the thin portion 22 inwardly of the end portions 23 and 24. The grooved portions are defined by a pair of radially outwardly opening grooves 30 and an intermediate inwardly opening groove 31 extending substantially through the thickness of the tube to effectively define a bellows construction which is relatively weak with respect to bending of the tube while yet being strong relative to circumferential, or torque, forces so as to discriminate between the bending forces and twisting forces and thereby effectively assure that only torque forces are delivered to the strain gauges 13. Illustratively, in the 600 maximum pound inch version of the torquemeter 10 as discussed above, the wall thickness at groove portions 28 and 29 was approximately 0.0875 inch and the thickness of the wall at the bottom of the grooves was approximately 0.01 inch. Thus, the thin portion 22 had a thickness of approximately one-half the thickness of the wall at the bottom of the grooves. The width of the groove was approximately 0.045 inch with the thickness of the walls 32 at axially opposite ends of the middle groove 31 being also approximately 0.01 inch.

Each of the torque measuring tube and the torque transmitting member may be formed of a suitable metal, such as 17-4 PH stainless steel. The torque measuring tube is preferably machined from a single piece of tubular stock to provide desired high accuracy in the relationship of the different portions thereof. The strain gauges 13 may be connected to suitable readout or control systems (not shown) as desired, and the sheathing wall 14 may be provided with a suitable wire opening 33 for passage of connecting wires outwardly from the strain gauges.

Thus, the torquemeter 10 defines an improved torque gauging transducer wherein a major portion of the transmitted torque is carried by the outer sheath 11 with the minor portion of the torque being mechanically amplified in the thin section wall 13 of the torque measuring tube 12 to provide a desired high accuracy torque signal. As the sheath wall 14 has a relatively large diameter, it may have a relatively thin wall thickness while yet providing a high torsion strength as a result of the high polar moment of inertia. As discussed above, the desired ratio of torque transmitted through the member 11 to that transmitted through the tube 12, may be preselected as desired by suitable correlation of the wall thicknesses. Thus, while the torquemeter of the present invention is extremely simple and economical of construction, it provides an improved gauging functioning correlated with the desired torque transmitting characteristics of the system in a novel and simple manner.

The foregoing disclosure of specific embodiments is illustrative of the broad inventive concepts comprehended by the invention.

I claim:

1. A hollow reaction torquemeter comprising: a tubular torque transmitting member having a radial thin wall mid-portion, one end adapted to receive a torque, and an opposite end adapted to deliver a torque transmitted from said one end through said mid-portion to said opposite end; a tubular torque measuring tube spaced radially, coaxially of said torque transmitting member and having axially spaced portions, a radially thin portion intermediate said spaced portions and having a length a minor portion of the length of the torque measuring tube, said torque measuring tube including means for substantially eliminating bending moment effect defined by a groove portion intermediate said thin portion and each of said spaced portions, each said grooved portion being defined by a first, radially inwardly opening groove and a second, radially outwardly opening groove axially spaced adjacent said first groove; means fixedly securing said spaced portions to said torque transmitting member, said torque transmitting member and torque measuring tube being constructed so that a first major portion of a torque being transmitted between said torque transmitting member ends is transmitted through said torque transmitting member and a second, minor portion of the torque is transmitted through said torque measuring tube; and means for gauging a twist strain carried by said torque measuring tube thin portion for determining the amount of torque being transmitted through the torque measuring tube of the torquemeter.

2. The hollow reaction torquemeter of claim 1 wherein said thin portion comprises the radially thinnest portion of said torque measuring tube, the thickness of the wall at the bottom of said grooves being substantially greater than the thickness of said thin portion.

3. The hollow reaction torquemeter of claim 1 wherein said thin portion has a wall thickness approximately one-half that of said torque measuring tube radially of said grooves.

4. The hollow reaction torquemeter of claim 1 wherein said torque transmitting member mid-portion has a wall thickness at least approximately one-and-a-half times that of said torque measuring tube at the bottom of the grooves.

5. The hollow reaction torquemeter of claim 1 wherein said spaced portions of the torque measuring tube are press fitted into said torque transmitting member opposite ends.

6. The hollow reaction torquemeter of claim 1 wherein said thin portion of said torque measuring tube is centered substantially midway between said grooved portions.

7. The hollow reaction torquemeter of claim 1 wherein said torque transmitting member mid-portion has a wall thickness approximately one one-hundredth the inner diameter thereof.

8. The hollow reaction torquemeter of claim 1 wherein said torque measuring tube thin portion has an axial length substantially greater than that of each of said grooved portions.

* * * * *